(12) United States Patent
Zhang

(10) Patent No.: US 9,711,139 B2
(45) Date of Patent: Jul. 18, 2017

(54) METHOD FOR BUILDING LANGUAGE MODEL, SPEECH RECOGNITION METHOD AND ELECTRONIC APPARATUS

(71) Applicant: VIA Technologies, Inc., New Taipei (TW)

(72) Inventor: Guo-Feng Zhang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 15/201,629

(22) Filed: Jul. 5, 2016

(65) Prior Publication Data

US 2016/0314783 A1    Oct. 27, 2016

Related U.S. Application Data

(62) Division of application No. 14/499,261, filed on Sep. 29, 2014.

(30) Foreign Application Priority Data

Oct. 18, 2013  (CN) .......................... 2013 1 0489580

(51) Int. Cl.
*G10L 15/187* (2013.01)
*G10L 15/14* (2006.01)
*G10L 15/26* (2006.01)
*G10L 15/06* (2013.01)

(52) U.S. Cl.
CPC .......... *G10L 15/187* (2013.01); *G10L 15/063* (2013.01); *G10L 15/14* (2013.01); *G10L 15/26* (2013.01); *G10L 2015/0633* (2013.01)

(58) Field of Classification Search
CPC ...................................................... G10L 15/187
USPC .......................................................... 704/235
See application file for complete search history.

(56) References Cited

U.S. PATENT DOCUMENTS

| 9,613,621 B2 * | 4/2017 | Zhang ................... G10L 15/187 |
| 2015/0112679 A1 * | 4/2015 | Zhang ................... G10L 15/187 704/243 |

\* cited by examiner

*Primary Examiner* — Susan McFadden
(74) *Attorney, Agent, or Firm* — Jianq Chyun IP Office

(57) ABSTRACT

A method for building a language model, a speech recognition method and an electronic apparatus are provided. The speech recognition method includes the following steps. Phonetic transcriptions of a speech signal are obtained from an acoustic model. Phonetic spellings matching the phonetic transcriptions are obtained according to the phonetic transcriptions and a syllable acoustic lexicon. According to the phonetic spellings, a plurality of text sequences and a plurality of text sequence probabilities are obtained from a language model. Each phonetic spelling is matched to a candidate sentence table; a word probability of each phonetic spelling matching a word in a sentence of the sentence table are obtained; and the word probabilities of the phonetic spellings are calculated so as to obtain the text sequence probabilities. The text sequence corresponding to a largest one of the sequence probabilities is selected as a recognition result of the speech signal.

22 Claims, 5 Drawing Sheets

METHOD FOR BUILDING LANGUAGE MODEL, SPEECH RECOGNITION METHOD AND ELECTRONIC APPARATUS

CROSS-REFERENCE TO RELATED APPLICATION

This application is a divisional application of and claims the priority benefit of U.S. application Ser. No. 14/499,261, filed on Sep. 29, 2014, now pending, which claims the priority benefit of China application serial no. 201310489580.0, filed on Oct. 18, 2013. The entirety of each of the above-mentioned patent applications is hereby incorporated by reference herein and made a part of this specification.

BACKGROUND OF THE INVENTION

Field of the Invention

The invention relates to a speech recognition technique, and more particularly, relates to a method for building a language model, a speech recognition method for recognizing speeches of different languages, dialects or pronunciation habits and an electronic apparatus thereof.

Description of Related Art

Speech recognition is no doubt a popular research and business topic. Generally, speech recognition is to extract feature parameters from an inputted speech and then compare the feature parameters with samples in the database to find and extract the sample that has less dissimilarity with respect to the inputted speech.

One common method is to collect speech corpus (e.g. recorded human speeches) and manually mark the speech corpus (i.e. annotating each speech with a corresponding text), and then use the corpus to train an acoustic model and an acoustic lexicon. Therein, the acoustic model and the acoustic lexicon are trained by utilizing a plurality of speech corpuses corresponding to a plurality of vocabularies and a plurality of phonetic transcriptions of the vocabularies marked in a dictionary. Accordingly, data of the speech corpuses corresponding to the phonetic transcriptions may be obtained from the acoustic model and the acoustic lexicon.

However, the current method faces the following problems. Problem 1: in case the phonetic transcriptions of vocabularies used for training the acoustic model is the phonetic transcriptions marked in the dictionary, if nonstandard pronunciation (e.g. unclear retroflex, unclear front and back nasals, etc.) of a user is inputted to the acoustic model, fuzziness of the acoustic model may increase since the nonstandard pronunciation is likely to be mismatched with the phonetic transcriptions marked in the dictionary. For example, in order to cope with the nonstandard pronunciation, the acoustic model may output "ing" that has higher probability for a phonetic spelling "in", which leads to increase of an overall error rate. Problem 2: due to different pronunciation habits in different regions, the nonstandard pronunciation may vary, which further increases fuzziness of the acoustic model and reduces recognition accuracy. Problem 3: dialects (e.g. standard Mandarin, Shanghainese, Cantonese, Minnan, etc.) cannot be recognized. Problem 4: mispronounce words (e.g., "貊" in "---丘之貉") should be pronounced as "he", yet many people mispronounce it as "he") cannot be recognized. Problem 5: because phonetic transcriptions are converted into vocabularies by the acoustic lexicon, a lot of speech information (e.g., accent locations) may lose to influence an accuracy in intension recognition, which leads to increase of an error rate in semanteme recognition.

SUMMARY OF THE INVENTION

The invention is directed to a method for building a language model, a speech recognition method and an electronic apparatus thereof, capable of eliminating ambiguity produced while mapping the speech to the text, thereby accurately recognizing a language and a semanteme corresponding to speeches of different languages, dialects or different pronunciation habits.

The invention provides a method for building a language model adapted to an electronic apparatus. The method for building the language model includes: receiving a plurality of candidate sentences; and obtaining a plurality of phonetic spellings matching each of words in each of the candidate sentences and a plurality of word probabilities according to a text corpus, so as to obtain a candidate sentence table corresponding to the candidate sentences.

The invention provides a speech recognition method adapted to an electronic apparatus. The speech recognition method includes following steps: obtaining a plurality of phonetic transcriptions of the speech signal according to an acoustic model, and the phonetic transcriptions including a plurality of phones; obtaining a plurality of phonetic spellings matching each of the phonetic transcriptions according to the phonetic transcriptions and a syllable acoustic lexicon; obtaining a plurality of text sequences and a plurality of text sequence probabilities from a language model according to the phonetic spellings, and this step includes: matching each of the phonetic spellings with a candidate sentence table, so as to obtain a word probability of each of the phonetic spellings corresponding to each of the words in the candidate sentences; and calculating the word probabilities of the phonetic spellings, so as to obtain the text sequence probabilities, wherein the candidate sentences corresponding to the text sequence probabilities are the text sequences; and selecting the text sequence corresponding to a largest one among the text sequence probabilities as a recognition result of the speech signal.

The invention further provides an electronic apparatus which includes a storage unit and a processing unit. The storage unit stores a plurality of program code segments. The processing unit is coupled to the storage unit. The processing unit executes a plurality of commands through the program code segments. The commands include: receiving a plurality of candidate sentences; and obtaining a plurality of phonetic spellings matching each of words in each of the candidate sentences and a plurality of word probabilities according to a text corpus, so as to obtain a candidate sentence table corresponding to the candidate sentences.

The invention further provides an electronic apparatus which includes an input unit, a storage unit and a processing unit. The input unit receives a speech signal. The storage unit stores a plurality of program code segments. The processing unit is coupled to the input unit and the storage unit, and the processing unit executes a plurality of commands through the program code segments. The commands include: obtaining a plurality of phonetic transcriptions of the speech signal according to an acoustic model, and the phonetic transcriptions including a plurality of phones; obtaining a plurality of phonetic spellings matching the phonetic transcriptions according to the phonetic transcriptions and a syllable acoustic lexicon; obtaining a plurality of text sequences and a plurality of text sequence probabilities from a language model according to the phonetic spellings, therein, this commands executed by the processing unit include: matching each of the phonetic spellings with a candidate sentence table, so as to obtain a word probability of each of the phonetic spellings corresponding to each of the words in the candidate sentences; and calculating the word probabilities of the phonetic spellings, so as to obtain the text sequence probabilities, wherein the candidate sentences corresponding to the text sequence probabilities are the text sequences; and selecting the text sequence corresponding to a largest one among the text sequence probabilities as a recognition result of the speech signal.

Based on above, when the speech recognition is performed on the speech signal, the electronic apparatus may obtain the phonetic transcriptions matching real pronunciations according to the acoustic model, and obtain the phonetic spellings matching the phonetic transcriptions from the syllable acoustic lexicon. Further, according to each of the phonetic spellings, the electronic apparatus may find the text sequence matching the phonetic spelling and the text sequence probabilities from the language model. The text sequence corresponding to the largest one among the text sequence probabilities is selected as a recognition result of the speech signal. Accordingly, the invention is capable of recognizing the phonetic spelling to the text according to the phonetic spelling corresponding to the real pronunciations of the speech inputs, thereby eliminating the ambiguity produced while mapping the speech to the text, and retaining the message inputted by the original speech input, so that the speech recognition may be more accurate.

To make the above features and advantages of the disclosure more comprehensible, several embodiments accompanied with drawings are described in detail as follows.

DESCRIPTION OF THE EMBODIMENTS

In traditional method of speech recognition, another common problem is that a recognition accuracy is easily influenced by a fuzzy sound of dialects in different regions, pronunciation habits of users, or different languages. Further, a speech recognition of conventional art generally outputs in text, thus numerous speech information (e.g., a semanteme that varies based on expression in different tones) may lose. Moreover, during a process for mapping pronunciations to texts, a probability generally used in conventional art is a probability of one specific pronunciation to one specific vocabulary. Therefore, homonyms may be mapped to the vocabularies with the same pronunciation, which leads to increase of an error rate in the process for mapping pronunciations to texts. Accordingly, the invention proposes a method for building a language model, a speech recognition method and an electronic apparatus thereof, which may improve the recognition accuracy on basis of the original speech recognition. In order to make the invention more comprehensible, embodiments are described below as the examples to prove that the invention can actually be realized.

Figure 1:
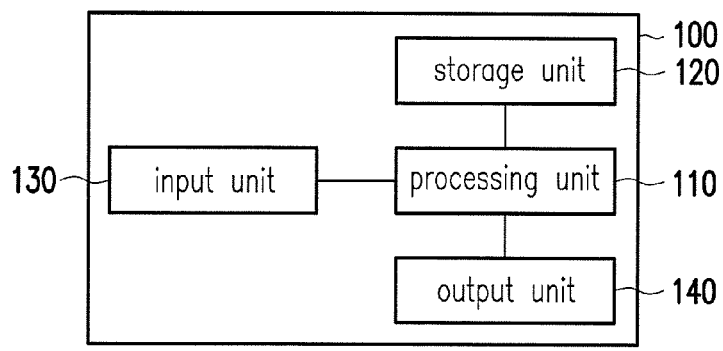
FIG. 1 is a block diagram of an electronic apparatus according to an embodiment of the invention.

FIG. 1 is a block diagram of an electronic apparatus according to an embodiment of the invention. Referring to FIG. 1, an electronic apparatus 100 includes a processing unit 110, a storage unit 120, and an input unit 130, also, an output unit 140 may be further included.

The electronic apparatus 100 may be various apparatuses with computing capabilities, such as a cell phone, a personal digital assistant (PDA) a smart phone, a pocket PC, a tablet PC, a notebook PC, a desktop PC, a car PC, but the invention is not limited thereto.

The processing unit 110 is coupled to the storage unit 120 and the input unit 130. The processing unit 110 may be a hardware with computing capabilities (e.g., a chip set, a processor and so on) for executing data in hardware, firmware and software in the electronic apparatus 100. In the present embodiment, the processing unit 110 is, for example, a central processing unit (CPU) or other programmable microprocessors, a digital signal processor (DSP), a programmable controller, an application specific integrated circuits (ASIC), a programmable logic device (PLD) or other similar apparatuses.

The storage unit 120 may store one or more program codes for executing the speech recognition method as well as data (e.g., a speech signal inputted by a user, an acoustic model, a syllable acoustic lexicon, a language model and a text corpus for the speech recognition) and so on. In the present embodiment, the storage unit 120 is, for example, a Non-volatile Memory (NVM), a Dynamic Random Access Memory (DRAM), or a Static Random Access Memory (SRAM).

The input unit 130 is, for example, a microphone configured to receive a voice from the user, and convert the voice of the user into the speech signal.

Hereinafter, the speech recognition method of the electronic apparatus 100 may be implemented by program codes in the present embodiment. More specifically, a plurality of program code segments are stored in the storage unit 120, and after said program code segments are installed, the processing unit 110 may execute a plurality of commands through the program code segments, so as to realize a method of building the acoustic model and the speech recognition method of the present embodiment. More specifically, the processing unit 110 may build the acoustic model, the syllable acoustic lexicon and the language model by executing the commands in the program code segments, and drives a speech recognition module through the program code segments to execute the speech recognition method of the present embodiment by utilizing the acoustic model, the syllable acoustic lexicon and the language model. Therein, the speech recognition module may be implemented by computer program codes. Or, in another embodiment of the invention, the speech recognition module may be implemented by a hardware circuit composed of one or more logic gates. Accordingly, the processing unit 110 of the present embodiment may perform the speech recognition on the speech signal received by the input unit 130 through the speech recognition module, so as to obtain a plurality of string probabilities and a plurality of strings by utilizing the acoustic model, the syllable acoustic lexicon and the language model. Moreover, the processing unit 110 may select the string corresponding to a largest one among the strings probabilities as a recognition result of the speech signal.

In addition, the present embodiment may further include the output unit 140 configured to output the recognition result of the speech signal. The output unit 140 is, for example, a display unit such as a Cathode Ray Tube (CRT) display, a Liquid Crystal Display (LCD), a Plasma Display, a Touch Display, configured to display a candidate string corresponding to the largest one among the string probabilities. Or, the output unit 140 may also be a speaker configured to play the candidate string corresponding to the largest one among the string probabilities.

Ii should be noted that, the processing unit 110 of the present embodiment may build the acoustic model, the syllable acoustic lexicon, the language model respectively for different languages, dialects or pronunciation habits, and said models and lexicon are stored in the storage unit 120.

More specifically, the acoustic model is, for example, a statistical classifier that adopts a Gaussian Mixture Model to analyze the received speech signals into basic phones, and classify each of the phones to corresponding basic phonetic transcriptions. Therein, the acoustic model may include basic phonetic transcriptions, transition between phones and non-speech phones (e.g., coughs) for recognizing the speech inputs of different languages, dialects or pronunciation habits. Generally, the syllable acoustic lexicon is composed of individual words of the language under recognition, and the individual words are composed of sounds outputted by the acoustic model through the Hidden Markov Model (HMM). Therein, for the monosyllabic language (e.g., Chinese), the phonetic transcriptions outputted by the acoustic model may be converted into corresponding vocabularies through the syllable acoustic lexicon. The language model mainly utilizes a probability statistical method to reveal the inherent statistical regularity of a language unit, wherein N-Gram is widely used for its simplicity and effectiveness.

An embodiment is given for illustration below.

Figure 2:
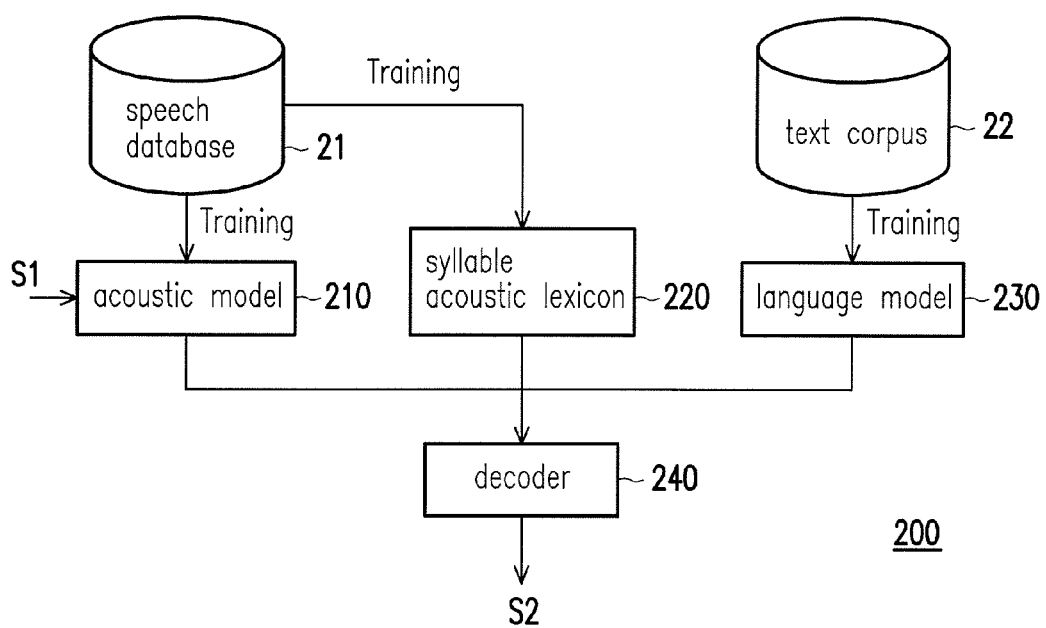
FIG. 2 is a schematic view of a speech recognition module according to an embodiment of the invention.

FIG. 2 is a schematic view of a speech recognition module according to an embodiment of the invention. Referring to FIG. 2, a speech recognition module 200 mainly includes an acoustic model 210, a syllable acoustic lexicon 220, a language model 230 and a decoder 240. Therein, the acoustic model 210 and the syllable acoustic lexicon 220 are obtained by training with a speech database 21, and the language model 230 is obtained by training with a text corpus 22. In the present embodiment, the speech database 21 and the text corpus 22 include a plurality of speech signals being, for example, speech inputs of different languages, dialects or pronunciation habits.

Referring to FIG. 1 and FIG. 2 together, the acoustic model 210 is configured to recognize the speech signals of different languages, dialects or pronunciation habits, so as to recognize a plurality of phonetic transcriptions matching pronunciations of the speech signal. In the present embodiment, the processing unit 110 obtains the acoustic model 210 through training with the speech signals based on different languages, dialects or pronunciation habits. More specifically, the processing unit 110 may receive the speech signals from the speech database 21 and receive the phonetic transcriptions matching the pronunciations in the speech signal, in which the pronunciation corresponding to each of the phonetic transcriptions includes a plurality of phones. Further, the processing unit 110 may obtain data of the phones corresponding to the phonetic transcriptions in the acoustic model 210 by training according to the speech signals and the phonetic transcriptions. More specifically, the processing unit 110 may obtain the speech signals corresponding to the speech inputs of different languages, dialects or pronunciation habits from the speech database 21, and obtain feature parameters corresponding to each of the speech signals by analyzing the phones of the each of the speech signals. Subsequently, a matching relation between the feature parameters of the speech signal and the phonetic transcriptions may be obtained through training with the feature parameters and the speech signals already marked with the corresponding phonetic transcriptions, so as to build the acoustic model 210.

The syllable acoustic lexicon 220 includes a plurality of vocabularies and fuzzy sound probabilities of each of the phonetic transcriptions matching each of the vocabularies. Herein, the processing unit 110 may search a plurality of vocabularies matching each of the phonetic transcriptions and the fuzzy sound probabilities of each of the vocabularies matching each of the phonetic transcription through the syllable acoustic lexicon 220. In the present embodiment, the processing unit 110 obtains the syllable acoustic lexicon through training with the speech signals based on different languages, dialects or pronunciation habits. More specifically, the processing unit 110 may obtain the fuzzy sound probabilities of each of the vocabularies matching each of the phonetic transcriptions by training with the phonetic transcription of the speech signal and the vocabularies respectively corresponding to each of the speech signals. It should be noted that, the processing unit 110 may mark each of the phonetic transcriptions in the speech signal with a corresponding code. In other words, for each vocabulary with the same character form but different pronunciations (i.e., the polyphone), such vocabulary includes different phonetic transcriptions for corresponding to each of the pronunciations. Further, such vocabulary includes at least one code, and each of the codes is corresponding to one of the different phonetic transcriptions. Accordingly, the syllable acoustic lexicon 220 of the present embodiment may include vocabularies corresponding to the phonetic transcriptions of the speech inputs having different pronunciations, and codes corresponding to each of the phonetic transcriptions.

The language model 230 is a design concept based on a history-based Model, that is, to gather statistics of the relationship between a series of previous events and an upcoming event according to a rule of thumb. Herein, the language model 230 is configured to recognize the string matching the code and the string probabilities of the string matching the code according to the codes for different vocabularies. In the present embodiment, the processing unit 110 may obtain the language model 230 through training with corpus data based on different languages, dialects or different pronunciation habits. Therein, the corpus data include a speech input having a plurality of pronunciations and a string corresponding to the speech input. Herein, the processing unit 110 obtains the string from the text corpus 22, and trains the codes respectively corresponding to the string and the vocabularies of the string, so as to obtain the data of the code matching each string.

The decoder 240 is a core of the speech recognition module 200 dedicated to search the string outputted with a largest probability possible for the inputted speech signal according to the acoustic model 210, the syllable acoustic lexicon 220 and the language model 230. For instance, by utilizing the corresponding phones and syllables obtained from the acoustic model 210 and words or vocabularies obtained from the syllable acoustic lexicon 220, the language model 230 may determine a probability for a series of words becoming a sentence.

Figure 3:
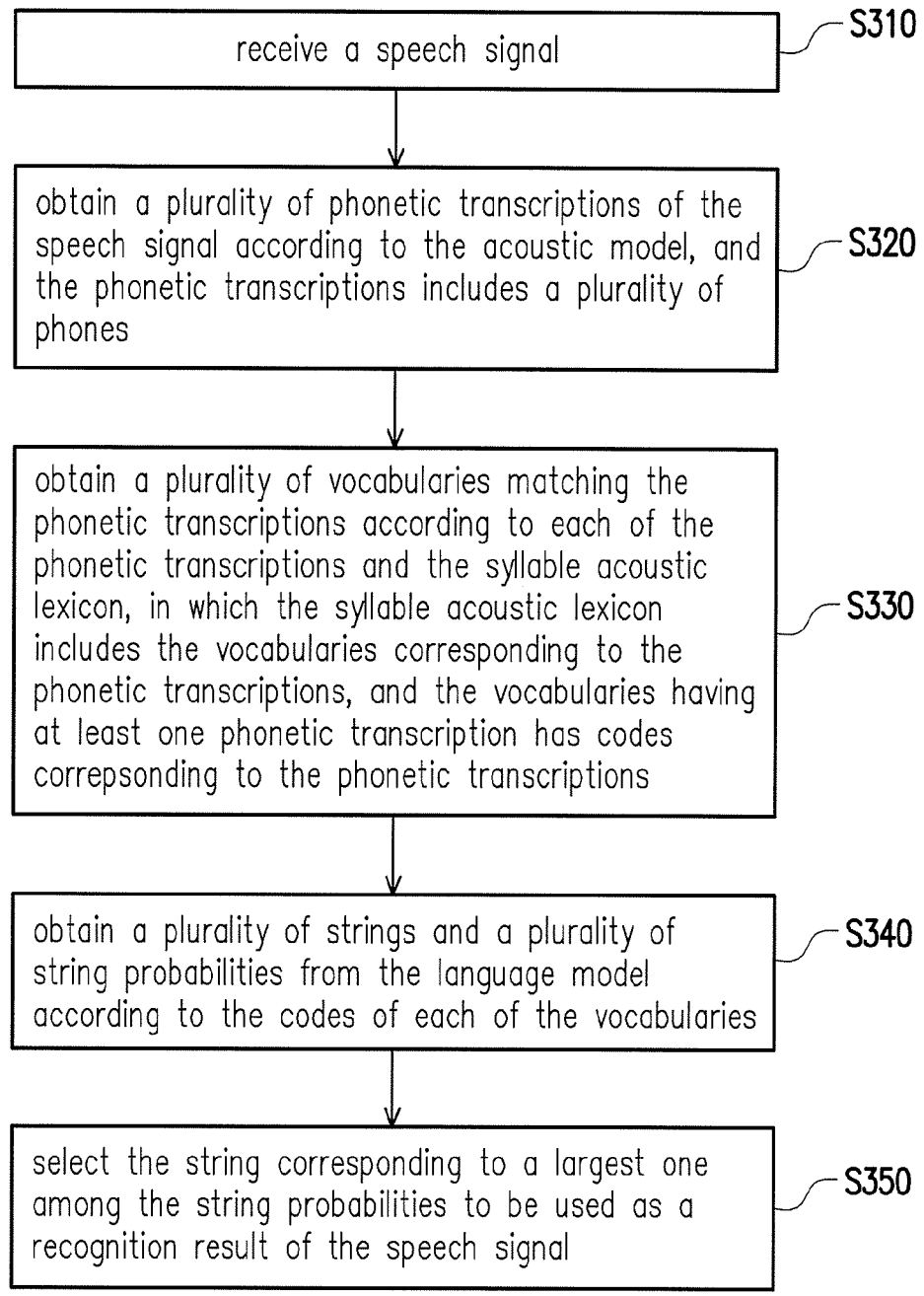
FIG. 3 is a flowchart illustrating the speech recognition method according to an embodiment of the invention.

The speech recognition method of the invention is described below with reference to said electronic apparatus 100 and said speech recognition module 200. FIG. 3 is a flowchart illustrating the speech recognition method according to an embodiment of the invention. Referring to FIG. 1, FIG. 2 and FIG. 3 together, the speech recognition method of the present embodiment is adapted to the electronic apparatus 100 for performing the speech recognition on the speech signal. Therein, the processing unit 110 may automatically recognize a language corresponding to the speech signal for different languages, dialects or pronunciation habits by utilizing the acoustic model 210, the syllable acoustic lexicon 220, the language model 230 and the decoder 240.

In step S310, the input unit 130 receives a speech signal S1, and the speech signal S1 is, for example, a speech input from a user. More specifically, the speech signal S1 is the speech input of a monosyllabic language, and the monosyllabic language is, for example, Chinese.

In step S320, the processing unit 110 may obtain a plurality of phonetic transcriptions of the speech signal S1 according to the acoustic model 210, and the phonetic transcriptions includes a plurality of phones. Herein, for the monosyllabic language, the phones are included in each of the syllables in the speech signal S1, and the syllable is corresponding to one phonetic transcription. For instance, two simple words "前進" include the syllables being "前" and "進", and the phones being "ㄑ", "一", "ㄢ", " ", "ㄐ", "一ㄣ" and "". Therein, "ㄑ", "一ㄢ", " " correspond to the phonetic transcription "qián", and "ㄐ", "一ㄣ", "" correspond to the phonetic transcription "jìn".

In the present embodiment, the processing unit 110 may select a training data from the acoustic model 210 according to a predetermined setting, and the training data is one of training results of different languages, dialects or different pronunciation habits. Herein, the processing unit 110 may search the phonetic transcriptions matching the speech signal S1 by utilizing the acoustic model 210 and selecting the speech signal in the training data and the basic phonetic transcriptions corresponding to the speech signal.

More specifically, the predetermined setting refers to which language the electronic apparatus 100 is set to perform the speech recognition with. For instance, it is assumed that the electronic apparatus 100 is set to perform the speech recognition according to the pronunciation habit of a northern, such that the processing unit 110 may select the training data trained based on the pronunciation habit of the northern from the acoustic model 210. Similarly, in case the electronic apparatus 100 is set to perform the speech recognition of Minnan, the processing unit 110 may select the training data trained based on Minnan from the acoustic model 210. The predetermined settings listed above are merely examples. In other embodiments, the electronic apparatus 100 may also be set to perform the speech recognition according to other languages, dialects or pronunciation habits.

Furthermore, the processing unit 110 may calculate the phonetic transcription matching probabilities of the phones in the speech signal S1 matching each of the basic phonetic transcriptions according to the selected acoustic model 210 and the phones in the speech signal S1. Thereafter, the processing unit 110 may select each of the basic phonetic transcriptions corresponding to a largest one among the phonetic transcription matching probabilities being calculated to be used as the phonetic transcriptions of the speech signal S1. More specifically, the processing unit 110 may divide the speech signal S1 into a plurality of frames, among which any two adjacent frames may have an overlapping region. Thereafter, a feature parameter is extracted from each frame to obtain one feature vector. For example, Mel-frequency Cepstral Coefficients (MFCC) may be used to extract 36 feature parameters from the frames to obtain a 36-dimensional feature vector. Herein, the processing unit 110 may match the feature parameter of the speech signal S1 with the data of the phones provided by the acoustic model 210, so as to calculate the phonetic transcription matching probabilities of each of the phones in the speech signal S1 matching each of the basic phonetic transcriptions. Accordingly, the processing unit 110 may select each of the basic phonetic transcriptions corresponding to the largest one among the phonetic transcription matching probabilities to be used as the phonetic transcriptions of the speech signal S1.

In step S330, the processing unit 110 may obtain a plurality of vocabularies matching the phonetic transcriptions according to each of the phonetic transcriptions and the syllable acoustic lexicon 220. Therein, the syllable acoustic lexicon 220 includes the vocabularies corresponding to the phonetic transcriptions, and each of the vocabularies includes at least one code. Further, for each vocabulary with the same character form but different pronunciations (i.e., the polyphone), each code of such vocabulary includes is corresponding to one phonetic transcription in the vocabulary.

Herein, the processing unit 110 may also select a training data from the syllable acoustic lexicon 220 according to a predetermined setting, and the training data is one of training results of different languages, dialects or different pronunciation habits. Further, the processing unit 110 may obtain the fuzzy sound probabilities of the phonetic transcriptions matching each of the vocabularies according to the training data selected from the syllable acoustic lexicon 220 and each of the phonetic spellings of the speech signal S1. It should be noted that, the polyphone may have different phonetic transcriptions based on different languages, dialects or pronunciation habits. Therefore, in the syllable acoustic lexicon 220, the vocabulary corresponding to each of the phonetic transcriptions includes the fuzzy sound probabilities, and the fuzzy sound probabilities may be changed according different languages, dialects or pronunciation habits. In other words, by using the training data trained based on different languages, dialects or pronunciation habits, the different fuzzy sound probabilities are provided for each of the phonetic transcriptions and the corresponding vocabularies in the syllable acoustic lexicon 220.

For instance, when the training data trained based on the pronunciation of the northern the syllable acoustic lexicon 220 is selected as the predetermined setting, for the phonetic transcription "fú", the corresponding vocabulary includes higher fuzzy sound probabilities for being "裡", "茯", "芙" and the corresponding vocabulary of "fú" includes lower fuzzy sound probabilities for being "胡", "湖", "壺". As another example, when the training data trained based on the pronunciation habits of most people in the syllable acoustic lexicon 220 is selected as the predetermined setting, for the phonetic transcription "hè", the corresponding vocabulary includes higher fuzzy sound probabilities for being "賀", "賀", "貉". It should be note that, most people tended to pronounce the vocabulary "貉" in "一丘之貉" as "ㄏㄜ" ("hè"). Therefore, the fuzzy sound probability of "he" corresponding to "貉" is relatively higher. Accordingly, by selecting the vocabulary corresponding to the largest one among the fuzzy sound probabilities, the processing unit 110 may obtain the vocabulary matching each of the phonetic transcriptions in the speech signal S1 according to specific languages, dialects or pronunciation habits.

On the other hand, the polyphone having different pronunciations may have different meanings based on the different pronunciations. Thus, in the present embodiment, for the polyphone with the same character form but different pronunciations, the processing unit 110 may obtain the code of each of the vocabularies, so as to differentiate the pronunciations of each of the vocabularies. Take the vocabulary "長" as the polyphone for example, the phonetic transcriptions thereof for the pronunciation in Chinese may be, for example, "cháng" or "zhǎng", and the phonetic transcriptions of "長" may even be, for example, "cêng", "zêng" (Cantonese tone) in terms of different dialects or pronunciation habits. Therefore, for the phonetic transcriptions of "長", the syllable acoustic lexicon may have said phonetic transcriptions corresponding to four codes, such as "c502", "c504", "c506" and "c508". Herein, above-said codes are merely examples, which may be represented in other formats (e.g., one of value, alphabet or symbol or a combination thereof). In other words, the syllable acoustic lexicon 220 of the present embodiment may regard the polyphone as different vocabularies, so that the polyphone may correspond to the strings having different meanings in the language model 230. Accordingly, when the processing unit 110 obtains the polyphone having different phonetic transcriptions by utilizing the syllable acoustic lexicon 220, since the different phonetic transcriptions of the polyphone may correspond to different codes, the processing unit 110 may differentiate the different pronunciations of the polyphone, thereby retaining a diversity of the polyphone in different pronunciations.

In step S340, the processing unit 110 may obtain a plurality of strings and a plurality of string probabilities from the language model 230 according to the codes of each of the vocabularies. More specifically, the language model 230 is configured to recognize the string matching the code and the string probabilities of the code matching the string according to the codes for different vocabularies. Accordingly, the processing unit 110 may calculate the string probabilities of the code matching each of the strings through the language model 230 according to the codes of the vocabularies obtained from the syllable acoustic lexicon 220. Therein, if the string probability calculated by the processing unit 110 is relatively lower, it indicates that a probability for the phonetic transcription corresponding to code to be used by the string is lower. Otherwise, if the string probability calculated by the processing unit 110 is relatively higher, it indicates that a probability for the phonetic transcription corresponding to code to be used by the string is higher.

Referring back to the polyphone "長", the code corresponding to the phonetic transcription thereof (e.g., "cháng", "zhǎng", "cêng" and "zêng") may be, for example, "c502", "c504", "c506" and "c508". Hereinafter, it is assumed that name of "市長" (i.e., mayor) of "南京" (i.e., Nanjing) is "江大橋". If the string probability for the code "c504" corresponding to the phonetic transcription "zhǎng" of "長" in the string " . . . 南京市長(ㄓㄤˇ)'江大橋..." is quite high, the processing unit 110 may determine that a probability for the vocabulary "長" with the phonetic transcription "zhǎng" to appear in "南京市'長江 大橋" is higher, and a probability for the vocabulary "市" to come before "長" is also higher. Further, at the same time, the processing unit 110 may determine that the string probability for the code "c504" corresponding to the phonetic transcription "zhǎng" of "長" in the string "南京是'長(ㄔㄤˊ)'江大橋的..." is relatively lower.

From another prospective, if the string probability for the code "c502" corresponding to the phonetic transcription "cháng" of "長" in the string "...南京是'長(ㄔㄤˊ)'江大橋的..." is relatively higher, the processing unit 110 may determine that a probability for the vocabulary "長" with the phonetic transcription "cháng" to appear in "南京是'長 江大橋的..." is higher, and a probability for the vocabulary "是" to come before "長" is also higher. In this case, the processing unit 110 may determine that string probability for the code "c502" corresponding to the phonetic transcription "cháng" of the vocabulary "長" in the string "南京市'長(ㄓㄤˇ)'江大橋" is relatively lower.

As another example, for the vocabulary "長", the phonetic transcription thereof may be "cháng" or "zhǎng". Despite that when the vocabulary "市" comes before the vocabulary "長", "長" is usually pronounced with the phonetic transcription "zhǎng", but it is also possible to pronounce it with the phonetic transcription "cháng". For instance, "南京市長江大橋" may refer to "'南京市'-'長(ㄔㄤˊ)'江大橋'" (i.e., Nanjing city-Yangtze river bridge)", or may also refer to "'南京'-'市長(ㄓㄤˇ)'-'江大橋'" (Nanjing-mayor Jiāng dà qiáo). Therefore, based on the code "c502" corresponding to the phonetic transcription "cháng" and the code "c504" corresponding to the phonetic transcription "zhǎng", the processing unit 110 may calculate the string probabilities for the codes "c502" and "c504" in the string "南京市長江大橋" according to the language model 230.

For instance, if the string probability for the code "c502" corresponding to the phonetic transcription "cháng" in the string "南京市長江大橋" is relatively higher, it indicates that a probability for the vocabulary "長" with the phonetic transcription "cháng" in the string "'南京市'-'長(ㄔㄤˊ)' 江大橋" is also higher. Or if the string probability for the code "c504" corresponding to the phonetic transcription "zhǎng" in the string "南京市長江大橋" is relatively higher, it indicates that a probability for the vocabulary "長" with the phonetic transcription "zhǎng" in the string "南京'-'市長(ㄓㄤˇ)'-'江大橋'" is also higher.

Thereafter, in step S350, the processing unit 110 may select the string corresponding to a largest one among the string probabilities to be used as a recognition result S2 of the speech signal S1. For instance, the processing unit 110 calculates, for example, a product of the fuzzy sound probabilities from the syllable acoustic lexicon 220 and the string probabilities from the language model 230 as associated probabilities, and selects a largest one among the associated probabilities of the fuzzy sound probabilities and the string probabilities to be used as the recognition result S2 of the speech signal S1. In other words, the processing unit 110 is not limited to only select the vocabulary best matching the phonetic transcription from the syllable acoustic lexicon 220, rather, the processing unit 110 may also select the string corresponding to the largest one among the string probabilities in the language model 230 as the recognition result S2 according to the vocabularies matching the phonetic transcription and the corresponding codes obtained from the syllable acoustic lexicon 220. Of course, the processing unit 110 of the present embodiment may also select the vocabulary corresponding to the largest one among the fuzzy sound probabilities in the syllable acoustic lexicon 220 to be used as a matched vocabulary of each phonetic transcription of the speech signal; calculate the string probabilities obtained in the language model 230 for each of the codes according to the matched vocabulary; and calculate the product of the fuzzy sound probabilities and the string probabilities as the associated probabilities, thereby selecting the string corresponding to the largest one among the associated probabilities.

More specifically, referring still to the polyphone "長" and the vocabulary "南京市長江大橋", the phonetic transcriptions of the "長" may be, for example, "cháng", "zhǎng", "cêng" and "zêng" which are respectively corresponding to the codes "c502", "c504", "c506" and "c508", respectively. Herein, when the phonetic transcription "cháng" has the fuzzy sound probability of the vocabulary "長" obtained through the syllable acoustic lexicon 220 being relatively higher, the processing unit 110 may select the string corresponding to the largest one among the string probabilities in the language model 230 as the recognition result according to the code "c502" corresponding to "長" and the phonetic transcription "cháng". For instance, if the code "c502" of "長" in the string "南京是長(彳尢)'江大橋的..." has the largest one among the string probabilities, the processing unit 110 may obtain the string "南京是長 江大橋的..." as the recognition result. However, if the code "c502" of "長" in the string " 南京市'-'長 (江大橋的... (彳尢')江大橋 '" has the largest one among the string probabilities, the processing unit 110 may obtain the string "'江大橋(南京市'-'長)彳尢'江大橋" as the recognition result. Or, when the phonetic transcription "zhǎng" has the fuzzy sound probability of the vocabulary "長" obtained through the syllable acoustic lexicon 220 being relatively higher, the processing unit 110 may select string corresponding to the largest one among the string probabilities in the language model 230 as the recognition result according to the code "c504" corresponding to "長" and the phonetic transcription "zhǎng". For instance, if the code "c504" of "長" in the string "' 南京'-'市長'-' 江大橋 '" has the largest one among the string probabilities, the processing unit 110 may obtain the string "'南京'-'市長'-'江大橋'" as the recognition result. Accordingly, besides that the phonetic transcription and the vocabulary corresponding to the phonetic transcription may be outputted, the electronic apparatus 100 may also obtain the fuzzy sound probabilities of the phonetic transcription matching the vocabulary under different languages, dialects or pronunciation habits. Further, according to the codes of the vocabulary, the electronic apparatus 100 may obtain the string probabilities of the vocabulary applied in different strings, so that the string matching the speech signal S1 may be recognized more accurately to improve the accuracy of the speech recognition.

Based on above, in the method of building the acoustic model, the speech recognition method and the electronic apparatus of the present embodiment, the electronic apparatus may build the acoustic model, the syllable acoustic lexicon and the language model by training the speech signal based on different languages, dialects or different pronunciation habits. Further, for the polyphone having more than one pronunciation, the electronic apparatus may give different codes for each of phonetic transcriptions of the polyphone, thereby retaining a diversity of the polyphone in different pronunciations. Therefore, when the speech recognition is performed on the speech signal, the electronic apparatus may obtain the vocabulary matching real pronunciations from the syllable acoustic lexicon according to the phonetic transcriptions obtained from the acoustic model. In particular, since the syllable acoustic lexicon includes the vocabulary having one or more phonetic transcriptions for corresponding to the code of each of the phonetic transcriptions, thus the electronic apparatus may obtain the matched string and the string probabilities thereof according to each of the codes. Accordingly, the electronic apparatus may select the string corresponding to the largest one among the string probabilities as the recognition result of the speech signal.

As a result, the invention may perform decoding in the acoustic model, the syllable acoustic lexicon, and the language model according to the speech inputs of different languages, dialects or different pronunciation habits. Further, besides that a decoding result may be outputted according to the phonetic transcription and the vocabulary corresponding to the phonetic transcription, the fuzzy sound probabilities of the phonetic transcription matching the vocabulary under different languages, dialects or pronunciation habits as well as the string probabilities of the vocabulary applied in different strings may also be obtained. Accordingly, the largest one among said probabilities may be outputted as the recognition result of the speech signal. In comparison with traditional methods, the invention is capable of accurately converting sound to text as well knowing the types of the languages, dialects or pronunciation habits. This may facilitate in subsequent machine speech conversations, such as direct answer in Cantonese for inputs pronounced in Cantonese. In addition, the invention may also differentiate meanings of pronunciations of the polyphone, so that the recognition result of the speech signal may be more close to the meaning corresponding to the speech signal.

It should be noted that, in order to avoid loss of speech messages (e.g., a sememe that varies based on expression in different tones) during the process for mapping pronunciations to texts, outputs of the phonetic transcription sequence and the syllable sequence corresponding to the phonetic transcription sequence may be sequentially obtained from the decoding result obtained according to the speech recognition method of the invention. Meanwhile, probabilities of the phonetic transcription sequence matching the syllable sequence under different languages, dialects or pronunciation habits, and probabilities of the syllable sequence being applied in different text sequence may also be obtained. Accordingly, the largest one among said probabilities may be outputted as the recognition result of the speech signal. As a result, the invention may further improve the accuracy of the speech recognition on basis of the original speech recognition. In order to make the invention more comprehensible, embodiments are described below as the examples to prove that the invention can actually be realized.

The present embodiment is also described by using the electronic apparatus 100 depicted in FIG. 1. The speech recognition method of the electronic apparatus 100 may also be implemented by program codes in the present embodiment. More specifically, a plurality of program code segments may be stored in the storage unit 120, and after said program code segments are installed, the processing unit 110 may execute a plurality of commands through the program code segments, so as to realize the speech recognition method of the present embodiment. More specifically, the processing unit 110 may build a speech recognition module including the acoustic model, the syllable acoustic lexicon and the language model by executing a plurality of commands in the program code segments. Further, the processing unit 110 may drive the speech recognition module through the program code segments to execute the speech recognition method of the present embodiment by utilizing the acoustic model, the syllable acoustic lexicon and the language model. Accordingly, the processing unit 110 of the present embodiment may perform the speech recognition on the speech signal received by the input unit 130 through the speech recognition module, so as to obtain a plurality of syllable sequence probabilities and a plurality of syllable sequences by utilizing the acoustic model, the syllable acoustic lexicon and the language model. Moreover, the processing unit 110 may select the syllable sequence or text sequence corresponding to a largest one among the phonetic spelling sequence probabilities as a recognition result of the speech signal.

Of course, the present embodiment may further include the output unit 140 configured to output the recognition result of the speech signal. For instance, the phonetic spelling sequence corresponding to the largest one among the phonetic spelling sequence probabilities or the strings corresponding to the phonetic spelling sequence may be displayed by the display unit 140. Or, the output unit 140 may also be a speaker configured to play the phonetic spelling sequence by voice. Further, details regarding the electronic apparatus 100 suitable for the speech recognition method of the present embodiment may refer to the same in the foregoing embodiment, thus related description thereof is omitted hereinafter.

An embodiment is further provided below and served to illustrate the speech recognition method of the present embodiment with reference to the electronic apparatus 100 depicted in FIG. 1.

Figure 4:
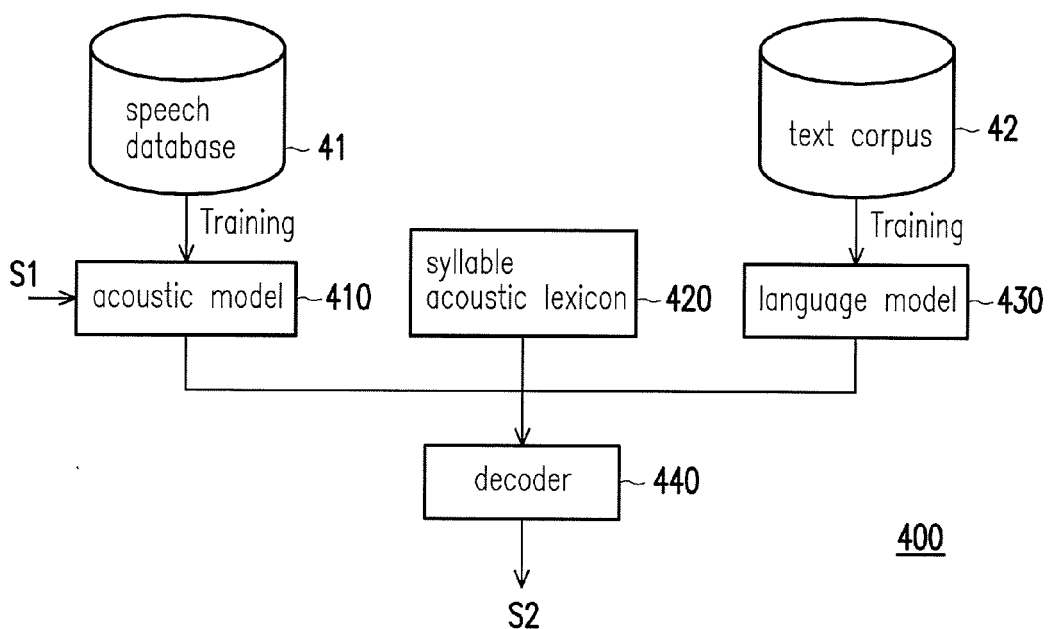
FIG. 4 is a schematic view of a speech recognition module according to an embodiment of the invention.

FIG. 4 is a schematic view of a speech recognition module according to an embodiment of the invention. Referring to FIG. 1 and FIG. 4, a speech recognition module 400 mainly includes an acoustic model 410, a syllable acoustic lexicon 420, a language model 430 and a decoder 440. The acoustic model 410 and the syllable acoustic lexicon are obtained by training with a speech database 41, and the language model 430 is obtained by training with a text corpus 42. Therein, the speech database 41 and the text corpus 42 include a plurality of speech signals being, for example, speech inputs of different languages, dialects or pronunciation habits, and the text corpus 42 further includes phonetic spellings corresponding to the speech signals. In the present embodiment, the processing unit 110 may build the acoustic model 410, the syllable acoustic lexicon 420, the language model 430 respectively through training with the speech recognition for different languages, dialects or pronunciation habits, and said models and lexicon are stored in the storage unit 120 to be used in the speech recognition method of the present embodiment.

More specifically, the acoustic model 410 is configured to recognize the speech signals of different languages, dialects or pronunciation habits, so as to recognize a plurality of phonetic transcriptions matching pronunciations of the speech signal. Furthermore, the acoustic model 410 is, for example, e, a statistical classifier that adopts a Gaussian Mixture Model to analyze the received speech signals into basic phones, and classify each of the phones to corresponding basic phonetic transcriptions. Therein, the acoustic model 410 may include the corresponding basic phonetic transcriptions, transition between phones and non-speech phones (e.g., coughs) for recognizing the speech inputs of different languages, dialects or pronunciation habits. In the present embodiment, the processing unit 110 obtains the acoustic model 410 through training with the speech signals based on different languages, dialects or pronunciation habits. More specifically, the processing unit 110 may receive the speech signals from the speech database 41 and receive the phonetic transcriptions matching the pronunciations in the speech signal, in which the pronunciation corresponding to each of the phonetic transcriptions includes a plurality of phones. Further, the processing unit 110 may obtain data of the phones corresponding to the phonetic transcriptions in the acoustic model 410 by training according to the speech signals and the phonetic transcriptions. More specifically, the processing unit 110 may obtain the speech signals corresponding to the speech inputs of different languages, dialects or pronunciation habits from the speech database 41, and obtain feature parameters corresponding to each of the speech signals by analyzing the phones of the each of the speech signals. Subsequently, a matching relation between the feature parameters of the speech signal and the phonetic transcriptions may be obtained through training with the feature parameters and the speech signals already marked with the corresponding phonetic transcriptions, so as to build the acoustic model 410.

The processing unit 110 may map the phonetic transcriptions outputted by the acoustic model 410 to the corresponding syllables through the syllable acoustic lexicon 420. Therein, the syllable acoustic lexicon 420 includes a plurality of phonetic transcription sequences and the syllable mapped to each of the phonetic transcription sequences. It should be noted that, each of the syllables includes a tone, and the tone refers to Yin, Yang, Shang, Qu, and Neutral tones. In terms of dialects, the phonetic transcription may also include other tones. In order to retain the pronunciations and tones outputted by the user, the processing unit 110 may map the phonetic transcriptions to the corresponding syllables with the tones according to the phonetic transcriptions outputted by the acoustic model 410.

More specifically, the processing unit 110 may map the phonetic transcriptions to the syllables through the syllable acoustic lexicon 420. Furthermore, according to the phonetic transcriptions outputted by the acoustic model 210, the processing unit 110 may output the syllable having the tones from the syllable acoustic lexicon 420, calculate a plurality of syllable sequence probabilities matching the phonetic transcriptions outputted by the acoustic model 410, and select the syllable sequence corresponding to a largest one among the syllable sequence probabilities to be used as the phonetic spellings corresponding to the phonetic transcriptions. For instance, it is assumed that the phonetic transcriptions outputted by the acoustic model 410 are "b" and "a", the processing unit 110 may obtain the phonetic spelling having the tone being "ba" (Shang tone) through the syllable acoustic lexicon 420.

According to the phonetic spellings for different vocabularies and an intonation information corresponding to the phonetic spellings, the language model 430 is configured to recognize the phonetic spelling sequence matching the phonetic spelling, and obtain the phonetic spelling sequence probabilities of the phonetic spelling matching the phonetic spelling sequence. The phonetic spelling sequence is, for example, the phonetic spellings for indicating the related vocabulary. More specifically, the language model 430 is a design concept based on a history-based Model, that is, to gather statistics of the relationship between a series of previous events and an upcoming event according to a rule of thumb. The language model 430 may utilize a probability statistical method to reveal the inherent statistical regularity of a language unit, wherein N-Gram is widely used for its simplicity and effectiveness. In the present embodiment, the processing unit 110 may obtain the acoustic model 430 through training with corpus data based on different languages, dialects or different pronunciation habits. Therein, the corpus data include a speech input having a plurality of pronunciations and a phonetic spelling sequence corresponding to the speech input. Herein, the processing unit 110 may obtain the phonetic spelling sequence from the text corpus 42, and obtains data (e.g., the phonetic spelling sequence probabilities for each of the phonetic spelling and the intonation information matching the phonetic spelling sequence) of the phonetic spellings having different tones matching each of phonetic spelling sequences by training the phonetic spelling sequence with the corresponding tones.

The decoder 440 is a core of the speech recognition module 400 dedicated to search the phonetic spelling sequence outputted with a largest probability possible for the inputted speech signal according to the acoustic model 410, the syllable acoustic lexicon 420 and the language model 430. For instance, by utilizing the corresponding phonetic transcription obtained from the acoustic model 410 and the corresponding phonetic spelling obtained from the syllable acoustic lexicon 420, the language model 430 may determine probabilities for a series of phonetic spelling sequences becoming a semanteme that the speech signal intended to express.

Figure 5:
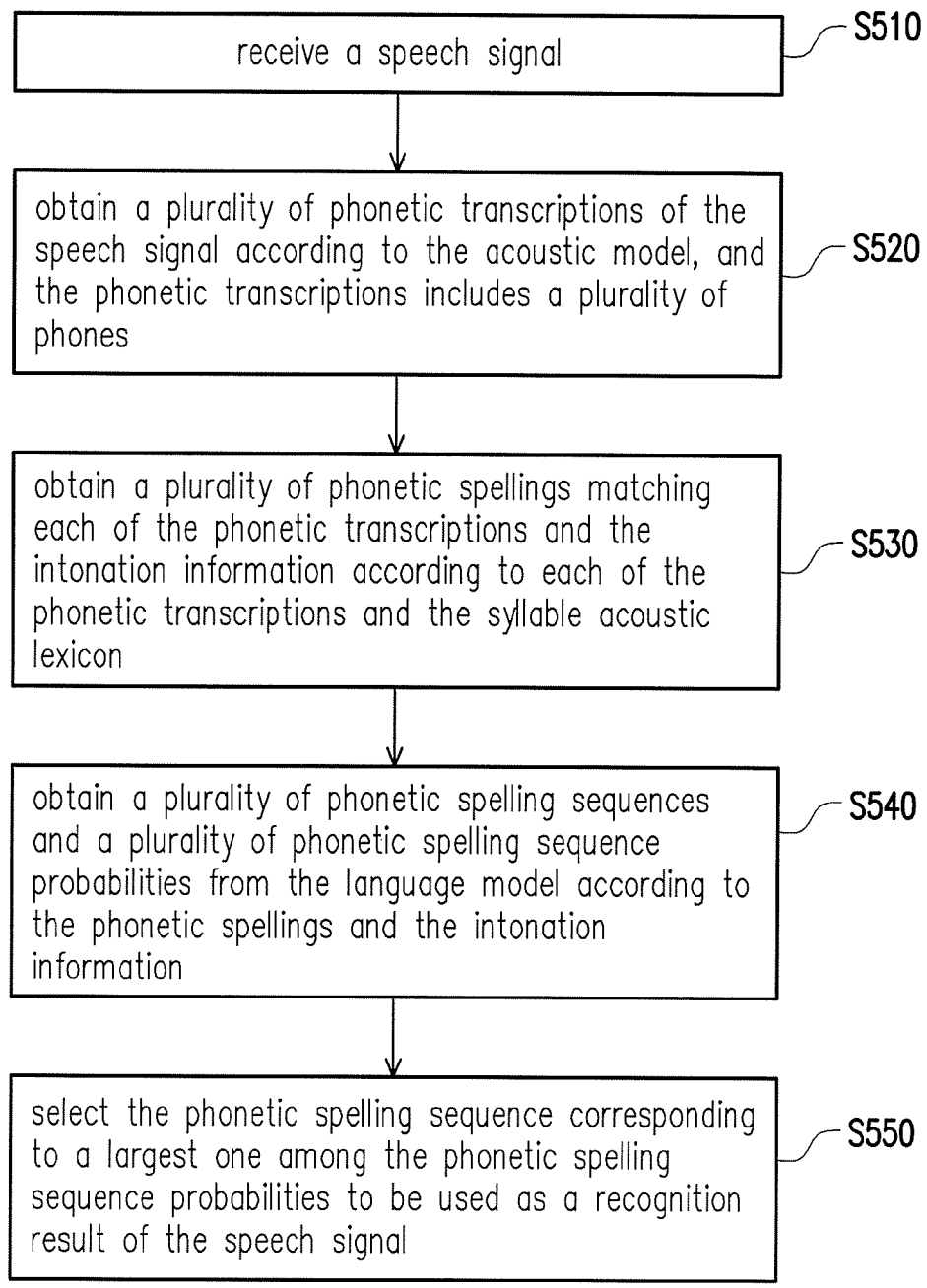
FIG. 5 is a flowchart illustrating the speech recognition method according to an embodiment of the invention.

The speech recognition method of the invention is described below with reference to said electronic apparatus 100 depicted in FIG. 1 and said speech recognition module 400. FIG. 5 is a flowchart illustrating the speech recognition method according to an embodiment of the invention. Referring to FIG. 1, FIG. 4 and FIG. 5 together, the speech recognition method of the present embodiment is adapted to the electronic apparatus 100 for performing the speech recognition on the speech signal. Therein, the processing unit 110 may automatically recognize a semanteme corresponding to the speech signal for different languages, dialects or pronunciation habits by utilizing the acoustic model 410, the syllable acoustic lexicon 420, the language model 430 and the decoder 440.

In step S510, the input unit 130 receives a speech signal S1, and the speech signal S1 is, for example, a speech input from a user. More specifically, the speech signal S1 is the speech input of a monosyllabic language, and the monosyllabic language is, for example, Chinese.

In step S520, the processing unit 110 may obtain a plurality of phonetic transcriptions of the speech signal S1 according to the acoustic model 410, and the phonetic transcriptions includes a plurality of phones. Herein, for the monosyllabic language, the phones are included in the speech signal S1, and the so-called phonetic transcription refers to a symbol that represents the pronunciation of the phone, namely, each of the phonetic transcription represents one phone. For instance, Chinese character "福" may have different pronunciations based on different language or dialects. For example, in standard Mandarin, the phonetic transcription of "福" is "fú", whereas in Chaoshan, the phonetic transcription of "福" is "hog4". As another example, the phonetic transcription of is "人" is "rén" in standard Mandarin. In Cantonese, the phonetic transcription of "人" is "jan4". In Minnan, the phonetic transcription of "人" is "lang2". In Guangyun, the phonetic transcription of "人" is "nin". In other words, each of the phonetic transcriptions obtained by the processing unit 110 from the acoustic model 410 is directly mapped to the pronunciation of the speech signal S1.

In order to increase an accuracy for mapping the pronunciation of the speech signal S1 to the phonetic transcription, the processing unit 110 of the present embodiment may select a training data from the acoustic model 410 according to a predetermined setting, and the training data is one of training results of different languages, dialects or different pronunciation habits. Accordingly, the processing unit 110 may search the phonetic transcriptions matching the speech signal S1 by utilizing the acoustic model 410 and selecting the speech signals in the training data and the basic phonetic transcriptions corresponding to the speech signals.

More specifically, the predetermined setting refers to which language the electronic apparatus 100 is set to perform the speech recognition with. For instance, it is assumed that the electronic apparatus 100 is set to perform the speech recognition according to the pronunciation habit of a northern, such that the processing unit 110 may select the training data trained based on the pronunciation habit of the northern from the acoustic model 410. Similarly, in case the electronic apparatus 100 is set to perform the speech recognition of Minnan, the processing unit 110 may select the training data trained based on Minnan from the acoustic model 410. The predetermined settings listed above are merely examples. In other embodiments, the electronic apparatus 100 may also be set to perform the speech recognition according to other languages, dialects or pronunciation habits.

Furthermore, the processing unit 110 may calculate the phonetic transcription matching probabilities of the phones in the speech signal S1 matching each of the basic phonetic transcriptions according to the selected acoustic model 210 and the phones in the speech signal S1. Thereafter, the processing unit 110 may select each of the basic phonetic transcriptions corresponding to a largest one among the phonetic transcription matching probabilities being calculated to be used as the phonetic transcriptions of the speech signal S1. More specifically, the processing unit 110 may divide the speech signal S1 into a plurality of frames, among which any two adjacent frames may have an overlapping region. Thereafter, a feature parameter is extracted from each frame to obtain one feature vector. For example, Mel-frequency Cepstral Coefficients (MFCC) may be used to extract 36 feature parameters from the frames to obtain a 36-dimensional feature vector. Herein, the processing unit 110 may match the feature parameter of the speech signal S1 with the data of the phones provided by the acoustic model 410, so as to calculate the phonetic transcription matching probabilities of each of the phones in the speech signal S1 matching each of the basic phonetic transcriptions. Accordingly, the processing unit 110 may select each of the basic phonetic transcriptions corresponding to the largest one among the phonetic transcription matching probabilities to be used as the phonetic transcriptions of the speech signal S1.

In step S530, the processing unit 110 may obtain a plurality of phonetic spellings matching the phonetic transcriptions and the intonation information corresponding to each of the phonetic spellings according to each of the phonetic transcriptions and the syllable acoustic lexicon 420. Therein, the syllable acoustic lexicon 420 includes a plurality of phonetic spellings matching each of the phonetic transcriptions, and possible tones for the pronunciations of such phonetic transcriptions in different semantemes when the phonetic transcription is pronounced. In the present embodiment, the processing unit 110 may also select a training data from the syllable acoustic lexicon 420 according to a predetermined setting, and the training data is one of training results of different languages, dialects or different pronunciation habits. Further, the processing unit 110 may obtain phonetic spelling matching probabilities of the phonetic transcription matching each of the phonetic spellings according to the training data selected from the syllable acoustic lexicon 420 and each of the phonetic transcriptions of the speech signal S1. It should be noted that, each of the vocabularies may have different phonetic transcriptions based on different languages, dialects or pronunciation habits, and each of the vocabularies may also include pronunciations having different tones based on different sememantemes. Therefore, in the syllable acoustic lexicon 420, the phonetic spelling corresponding to each of the phonetic transcriptions includes the phonetic spelling matching probabilities, and the phonetic spelling matching probabilities may vary based on different languages, dialects or pronunciation habits. In other words, by using the training data trained based on different languages, dialects or different pronunciation habits, different phonetic spelling matching probabilities are provided to each of the phonetic transcriptions and the corresponding phonetic spelling in the syllable acoustic lexicon 420.

For instance, when the syllable acoustic lexicon 420 with the training data trained based on the pronunciation of the northern is selected as the predetermined setting, for the phonetic transcription pronounced as "fú", the phonetic spelling thereof include a higher phonetic spelling matching probability for being "Fú" and a lower phonetic spelling matching probability for being "Hú". More specifically, in case the vocabulary "福" is said by the northern, the processing unit 110 may obtain the phonetic transcription "fú" from the acoustic model 410, and obtain the phonetic spelling "Fú" as the higher phonetic spelling matching probability and the phonetic spelling "Hú" as the lower phonetic spelling matching probability from the syllable acoustic lexicon 420. Herein, the phonetic spelling corresponding to the phonetic transcription "fú" may have different phonetic spelling matching probabilities based on different pronunciation habits in different regions.

As another example, when the syllable acoustic lexicon 420 with the training data trained based on the pronunciation of most people is selected as the predetermined setting, for the phonetic transcription pronounced as "yíng", the phonetic spelling thereof include a higher phonetic spelling matching probability for being "Yíng" and a lower phonetic spelling matching probability for being "Xiǎng". More specifically, when the vocabulary "影響" is said by the user, the processing unit 110 may obtain the phonetic transcription "yíng" from the acoustic model 410, and obtain phonetic spelling matching probabilities corresponding to the phonetic spellings "Xiǎng" and "Yíng" in the syllable acoustic lexicon 420, respectively. Herein, the phonetic spelling corresponding to the phonetic transcription "yíng" may have different phonetic spelling matching probabilities based on different sememantemes.

It should be noted that, the speech input composed of the same text may become the speech signals having different tones based on different sememantemes or intentions. Therefore, the processing unit 110 may obtain the phonetic spelling matching the tones according to the phonetic spelling and the intonation information in the syllable acoustic lexicon 420, thereby differentiating the phonetic spellings of different sememantemes. For instance, for the speech input corresponding to a sentence "今天很好", a sememanteme thereof may be of interrogative or affirmative sentences. Namely, the tone corresponding to the vocabulary "好" in "今天很好?" is relatively higher, and the tone corresponding to the vocabulary "好" in "今天很好。" is relatively lower. More specifically, for the phonetic transcription pronounced as "hǎo", the processing unit 110 may obtain the phonetic spelling matching probabilities corresponding to the phonetic spellings "háo" and "hǎo" from the syllable acoustic lexicon 420.

In other words, the processing unit 110 may recognize the speech inputs having the same phonetic spelling but different tones according to the tones in the syllable acoustic lexicon 420, so that the phonetic spellings having different tones may correspond to the phonetic spelling sequences having different meanings in the language model 430. Accordingly, when the processing unit 110 obtains the phonetic spellings by utilizing the syllable acoustic lexicon 420, the intonation information of the phonetic spelling may also be obtained at the same times, thus the processing unit 110 is capable of recognizing the speech inputs having different sememantemes.

In step S540, the processing unit 110 may obtain a plurality of phonetic spelling sequences and a plurality of phonetic spelling sequence probabilities from the language model 430 according to each of the phonetic spelling and the intonation information. Herein, different intonation information in the language model 430 may be divided into different sememantemes, and the sememantemes are corresponding to different phonetic spelling sequences. Accordingly, the processing unit 110 may calculate the phonetic spelling sequence probability for the phonetic spelling and the intonation information matching each of the phonetic spelling sequences through the language model 430 according to the phonetic spelling and the intonation information obtained from the syllable acoustic lexicon 420, thereby finding the phonetic spelling sequence matching the intonation information.

More specifically, the language model 430 of the present embodiment further includes a plurality of phonetic spelling sequence corresponding to a plurality of keywords, and the keywords are, for example, substantives such as place names, person names or other fixed terms or phrases. For example, the language model 430 includes the phonetic spelling sequence "Cháng-Jiāng-Dà-Qiáo" corresponding to the keyword "長江大橋". Therefore, when the processing unit 110 matches the phonetic spelling and the intonation information obtained from the syllable acoustic lexicon 420 with the phonetic spelling sequence in the language model 430, whether the phonetic spelling matches the phonetic spelling sequence corresponding to each of the keywords in the language model 430 may be compared. In case the phonetic spelling matches the phonetic spelling sequence corresponding to the keyword, the processing unit 110 may obtain higher phonetic spelling sequence probabilities. Accordingly, if the phonetic spelling sequence probability calculated by the processing unit 110 is relatively lower, it indicates that a probability for the intonation information corresponding to phonetic spelling to be used by the phonetic spelling sequence is lower. Otherwise, if the phonetic spelling sequence probability calculated by the processing unit 110 is relatively higher, it indicates that a probability for the intonation information corresponding to phonetic spelling to be used by the phonetic spelling sequence is higher.

Thereafter, in step S550, the processing unit 110 may select the phonetic spelling sequence corresponding to a largest one among the phonetic spelling sequence probabilities to be used as a recognition result S2 of the speech signal S1. For instance, the processing unit 110 calculates, for example, a product of the phonetic spelling matching probabilities from the syllable acoustic lexicon 420 and the phonetic spelling sequence probabilities from the language model 430 as associated probabilities, and selects a largest one among the associated probabilities of the phonetic spelling matching probabilities and the phonetic spelling sequence probabilities to be used as the recognition result S2 of the speech signal S1. In other words, the processing unit 110 is not limited to only select the phonetic spelling and the intonation information best matching the phonetic transcription from the syllable acoustic lexicon 420, the processing unit 110 may also select the phonetic spelling sequence corresponding to the largest one among the phonetic spelling sequence probabilities in the language model 430 to be used as the recognition result S2 according to the phonetic spellings and the intonation information matching the phonetic transcriptions obtained from the syllable acoustic lexicon 420. Of course, the processing unit 110 of the present embodiment may also select the phonetic spelling and the intonation information corresponding to the largest one among the phonetic spelling matching probabilities in the syllable acoustic lexicon 420 to be used as a matched phonetic spelling of each phonetic transcription of the speech signal; calculate the phonetic spelling sequence probabilities obtained in the language model 430 for each of the phonetic spellings according to the matched phonetic spelling; and calculate the product of the phonetic spelling matching probabilities and the phonetic spelling sequence probabilities as the associated probabilities, thereby selecting the phonetic spelling corresponding to the largest one among the associated probabilities.

It should be noted that, the phonetic spelling sequence obtained by the processing unit 110 may also be converted into corresponding text sequence through a semanteme recognition module (not illustrated), and the semanteme recognition module may search a text corresponding to the phonetic spelling sequence according to a phonetic spelling-based recognition database (not illustrated). More specifically, the recognition database includes data of the phonetic spelling sequence corresponding to the text sequence, such that the processing unit 110 may further convert the phonetic spelling sequence into the text sequence through the semanteme recognition module and the recognition database, and the text sequence may then be displayed by the output unit 140 for the user.

An embodiment is further provided below and served to illustrate the speech recognition method of the present embodiment, in which it is assumed that the speech signal S1 from the user is corresponding to an interrogative sentence "南京市長江大橋". Herein, the input unit 130 receives the speech signal S1, and the processing unit 110 obtains a plurality of phonetic transcriptions (i.e., "nán", "jīng", "shì", "cháng", "jiāng", "dà", "qiáo") of the speech signal S1 according the acoustic model 410. Next, according to the phonetic transcriptions and the syllable acoustic lexicon 420, the processing unit 110 may obtain the phonetic spellings matching the phonetic transcription and the intonation information corresponding to the phonetic transcriptions. The phonetic spellings and the corresponding intonation information may partly include the phonetic spelling matching probabilities for "Nán", "Jīng", "Shì", "Cháng", "Jiāng", "Dà", "Qiáo", or partly include the phonetic spelling matching probabilities for "Nán", "Jīng", "Shì", "Zhǎng", "Jiāng", "Dà" "Qiáo". Herein, it is assumed that higher phonetic spelling matching probabilities are provided when the phonetic transcriptions ("nán", "jīng", "shì", "cháng", "jiāng", "dà"m, "qiáo") are corresponding to the phonetic spellings ("Nán", "Jīng", "Shì", "Cháng", "Jiāng", "Dà", "Qiáo").

Thereafter, the processing unit 110 may obtain a plurality of phonetic spelling sequences and a plurality of phonetic spelling sequence probabilities from the language model 230 according to the phonetic spellings ("Nán", "Jīng", "Shì", "Cháng", "Jiāng", "Dà", "Qiáo", and the phonetic spellings "Nán", "Jīng", "Shì", "Zhǎng", "Jiāng", "Dà", "Qiáo". In this case, it is assumed that the "Cháng", "Jiāng", "Dà", "Qiáo" match the phonetic spelling sequence "Cháng-Jiāng-Dà-Qiáo" of the keyword "長江大橋" in the language model 430, so that the phonetic spelling sequence probability for "Nán-Jīng-Shì-Cháng-Jiāng-Dà-Qiáo" is relatively higher. Accordingly, the processing unit 110 may use "Nán-Jīng-Shì-Cháng-Jiāng-Dà-Qiáo" as the phonetic spelling sequence for output.

Based on above, in the speech recognition method and the electronic apparatus of the present embodiment, the electronic apparatus may build the acoustic model, the syllable acoustic lexicon, and the language model by training with the speech signal based on different languages, dialects or different pronunciation habits. Therefore, when the speech recognition is performed on the speech signal, the electronic apparatus may obtain the phonetic transcriptions matching real pronunciations according to the acoustic model, and obtain the phonetic spellings matching the phonetic transcriptions from the syllable acoustic lexicon. In particular, since the syllable acoustic lexicon includes the intonation information of each of the phonetic spellings in different semantemes, the electronic apparatus is capable of obtaining the phonetic spelling sequence matching the phonetic spelling and the phonetic spelling sequence probabilities thereof according to the intonation information. Accordingly, the electronic apparatus may select the phonetic spelling sequence corresponding to the largest one among the phonetic spelling sequence probabilities as the recognition result of the speech signal.

As a result, the invention may perform decoding in the acoustic model, the syllable acoustic lexicon, and the language model according to the speech inputs of different languages, dialects or pronunciation habits. Further, besides that a decoding result may be outputted according to the phonetic spelling corresponding to the phonetic transcription, the phonetic spelling matching probabilities of the phonetic transcription matching the phonetic spelling under different languages, dialects or pronunciation habits as well as the phonetic spelling sequence probabilities of each of the phonetic spellings in different phonetic spelling sequences may also be obtained. Lastly, the invention may select the largest one among said probabilities to be outputted as the recognition result of the speech signal. In comparison with traditional methods, the invention is capable of obtaining the phonetic spelling sequence corresponding to the real pronunciations of the speech input, hence the message inputted by the original speech input (e.g., a polyphone in different pronunciations) may be retained. Moreover, the invention is also capable of converting the real pronunciations of the speech input into the corresponding phonetic spelling sequence according to types of different languages, dialects or pronunciation habits. This may facilitate in subsequent machine speech conversations, such as direct answer in Cantonese (or other dialects/languages) for inputs pronounced in Cantonese (or other dialects/languages). In addition, the invention may also differentiate meanings of each of the phonetic spellings according to the intonation information of the real pronunciations, so that the recognition result of the speech signal may be more close to the meaning corresponding to the speech signal. Accordingly, the speech recognition method and the electronic apparatus of the invention may be more accurate in recognizing the language and the semanteme corresponding to the speech signal of different languages, dialects or different pronunciation habits, so as to improve the accuracy of the speech recognition.

It should be noted that, during the process of obtaining the phonetic spelling sequences and the phonetic spelling sequence probabilities by the processing unit 110 through the language model 430, a probability for one specific phonetic spelling mapping to the phonetic spelling sequence of one specific vocabulary is obtained, which is hereby defined as a positive probability. The speech recognition method of the present embodiment may also achieve a higher speech recognition accuracy by using a negative probability, so as to further determine different texts respectively corresponding to the same pronunciation. In other words, the processing unit 110 may further process through the language model 430 for mapping the phonetic spelling to the corresponding text. Therein, the processing unit 110 may search a probability of the each of the words matching possible pronunciations of the said words in each of candidate sentences, so as to obtain a plurality of texts matching the phonetic spellings and a probability of the phonetic spelling matching each of the texts. Lastly, a largest one among said probabilities is used as the recognition result of the speech signal (i.e., the text sequence corresponding to the speech signal). Accordingly, for pronunciations changed based on the homonyms or different habits (i.e., pronunciations from different dialects), the speech recognition method of the present embodiment may obtain the texts corresponding to those pronunciations more accurately, thereby significantly improve the accuracy in recognition In order to make the invention more comprehensible, embodiments are described below as the examples to prove that the invention can actually be realized. Hereinafter, the speech recognition method of the invention is still described below with reference to said electronic apparatus 100 depicted in FIG. 1 and said speech recognition module 400.

The present embodiment is similar to the foregoing embodiment, a difference between the two is that: The processing unit 110 of the present embodiment may obtain a plurality of text sequence probabilities and a plurality of text sequences from the speech signal S1 received by the input unit 130 by utilizing the acoustic model 410, the syllable acoustic lexicon 420 and the language model 430. Moreover, the processing unit 110 may select the text sequence corresponding to a largest one among the text sequence probabilities as a recognition result S2 of the speech signal.

Figure 6:
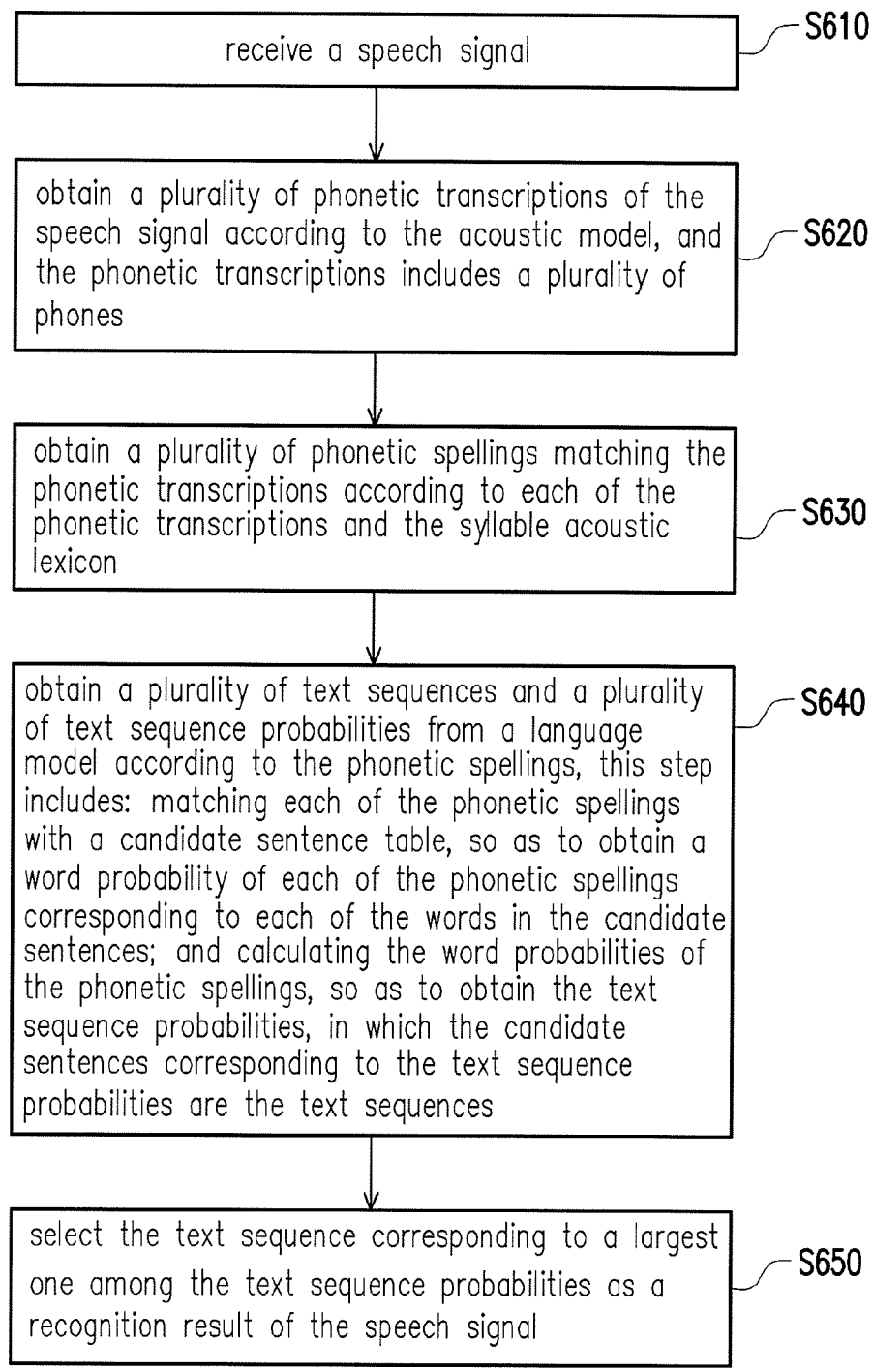
FIG. 6 is a flowchart illustrating the speech recognition method according to an embodiment of the invention.

FIG. 6 is a flowchart illustrating the speech recognition method according to an embodiment of the invention. Referring to FIG. 1, FIG. 4 and FIG. 6 together, in step S610, the input unit 130 receives a speech signal S1, and the speech signal S1 is, for example, a speech input from a user. In step S620, the processing unit 110 may obtain a plurality of phonetic transcriptions of the speech signal S1 according to the acoustic model 410, and the phonetic transcriptions include a plurality of phones. In step S630, the processing unit 110 may obtain a plurality of phonetic spellings matching the phonetic transcriptions according to each of the phonetic transcriptions and the syllable acoustic lexicon 420. Above-said step S610 to S630 are similar to steps S510 to S530, thus related description may refer to the description of relating paragraphs.

In step S640, the processing unit 110 may obtain a plurality of text sequences and a plurality of text sequence probabilities from the language model 430 according to each of the phonetic spellings. Herein, the processing unit 110 may match each of the phonetic spelling with the candidate sentences. A candidate sentence table records the candidate sentences, the phonetic spellings matching each of words in the candidate sentences, and a word probability for each of the words and each of the phonetic spellings. Therefore, the processing unit 110 may obtain the word probability of each of the phonetic spellings corresponding to each of the words in the candidate sentences through the candidate sentence table. Further, the processing unit 110 may calculate the word probabilities of the phonetic spellings so as to obtain the text sequence probabilities, and the candidate sentences corresponding to the text sequence probabilities are the text sequences.

More specifically, the processing unit 110 may generate the candidate sentence table in advance, so as to build the language model 430. Therein, the processing unit 110 may receive a plurality of candidate sentences, and obtain a plurality of phonetic spellings matching each of the words in each of the candidate sentences and a plurality of word probabilities according to the text corpus 42, so as to obtain the candidate sentence table corresponding to the candidate sentences. More specifically, the processing unit 110 may receive a plurality of speech signals through the input unit 130, and obtain the text corpus 42 through training with the speech signals based on different languages, dialects or pronunciation habits. Herein, the processing unit 110 may receive the phonetic spellings matching each of the words according to the corresponding words in the speech signals for training, thereby training according to each of the words and the phonetic spellings for obtaining the word probabilities of each of the words corresponding to each of the phonetic spellings in the text corpus 42.

For instance, the processing unit 110 may receive the speech signal "你好" outputted in different languages, dialects or different pronunciation habits from the input unit 130. Pronunciations based on different languages, dialects or different pronunciation habits are different from one another. Therefore, the pronunciations corresponding to the speech signal "你好" may include the phonetic spellings of "nǐ-hǎo" (corresponding to the pronunciation of the northern), "něi-hǒu" or "nhij-ho" (corresponding to the pronunciation of a southern), or other different phonetic spellings. In this case, the processing unit 110 may calculate possible phonetic spellings corresponding to "你" and "好" and the corresponding probabilities thereof (i.e., the word probabilities) by training according to the speech signal "你好" and the corresponding phonetic spellings "nǐ-hǎo", "něi-hǒu" or "nhij-ho". Take the pronunciation of the northern as an example, the word probabilities of the speech signal "你" corresponding to "nǐ", "něi" and "nhij" are sequentially 90%, 8% and 2%; whereas the word probabilities of the speech signal "好" corresponding to "hǎo", "hǒu" and "ho" are sequentially 82%, 10% and 8%. In other words, the candidate sentence table obtained by the processing unit 110 records a relation between each of the words and their possible pronunciations. Therein, each of the possible pronunciations may be annotated by the phonetic spellings, and the word probability is higher when each of the words has a higher chance of corresponding to one specific phonetic spelling. Accordingly, in the language model 430, the processing unit 110 may obtain the possible word of the specific phonetic spelling according to each of the phonetic spellings.

Furthermore, the processing unit 110 may calculate the word probabilities corresponding to the phonetic spellings by multiplying the word probabilities corresponding to each of the phonetic spellings in the speech signal S1 together, so as to obtain a product of the probabilities corresponding to the speech signal S1 to be used as the text sequence probabilities, and obtain the candidate sentences constituted by the words corresponding to the phonetic spellings to be used as the text sequence. For instance, it is assumed that the phonetic spelling obtained from the syllable acoustic lexicon 420 is "něi-hǒu". Next, according to the candidate sentence table, the processing unit 110 may have the phonetic spelling "něi" corresponding to the word "你", and the phonetic spelling "hǒu" corresponding to the word "好". Further, the processing unit 110 may multiple the word probabilities corresponding to "něi" and the word probabilities corresponding to "hǒu" together, so as to obtain the candidate sentences corresponding to "你好" as the text sequence, and the text sequence probabilities at the time. Of course, the processing unit 110 may also have the phonetic spellings of "něi-hǒu" corresponding to other words (e.g., corresponding to the text sequence "內訌"), so as to obtain other text sequence probabilities (e.g., probabilities for corresponding to the text sequence "內訌").

In step S650, the processing unit 110 may select the text sequence corresponding to a largest one among the text sequence probabilities as a recognition result S2 of the speech signal. For instance, it is assumed that, for the phonetic spellings "něi-hǒu", the text sequence probability corresponding to the text sequence "你好" obtained by the processing unit 110 is P1; the text sequence probability corresponding to the text sequence "內訌" obtained by the processing unit 110 is P2; and the text sequence probability corresponding to the text sequence "泥濘" obtained by the processing unit 110 is P3. Therein, P1 is greater than P2, and P1 is greater than P3. Accordingly, the processing unit 110 may select the text sequence "你好" corresponding to the text sequence probability P1 as the recognition result S2. Of course, the processing unit 110 may also display the text sequence corresponding to the largest one among the text sequence probabilities or other possible text sequences through the output unit 140, so that the user may intuitively recognize the recognition result S2.

It should be noted that, in the step of obtaining the text sequence and calculating the corresponding text sequence probabilities, the processing unit 110 may also select a result with a higher probability (i.e., each of the phonetic transcriptions and the phonetic transcription matching probabilities obtained by the processing unit 110 from the acoustic model 410, each of the phonetic spellings and the phonetic spelling matching probabilities obtained by the processing unit 110 from the syllable acoustic lexicon 420, and each of the words corresponding to each of the phonetic spellings and the word probabilities obtained by the processing unit 110 from the language model 430) according to different threshold values for calculations in different models. More specifically, according to a first threshold value, the processing unit 110 may select the phonetic transcription having the phonetic transcription matching probability being greater than the first threshold value, and generate the corresponding phonetic spelling according to the phonetic transcriptions in the syllable acoustic lexicon 420. Meanwhile, according to a second threshold value, the processing unit 110 may select the phonetic spelling having the phonetic spelling matching probability being greater than the second threshold value, and generate the corresponding text sequence and the text sequence probabilities according to the phonetic spellings in the syllable acoustic lexicon 430. In other words, the text sequence probabilities calculated by the processing unit 110 is a product of the phonetic transcription matching probabilities, the phonetic spelling matching probabilities, and the word probabilities. Therefore, the processing unit 110 may select the text sequence corresponding to the largest one among associated probabilities including the phonetic transcription matching probabilities, the phonetic spelling matching probabilities, and the word probabilities, to be used as the recognition result S2 of the speech signal. Accordingly, the speech recognition method of the present embodiment is capable of accurately obtaining the text sequence of one specific pronunciation according to the pronunciation of the user, so as to eliminate a lot of ambiguity produced while mapping the speech to the text thereby significantly improve the accuracy in the speech recognition.

In view of above, in the method for building the language model, speech recognition method and the electronic apparatus of the present embodiment, when the speech recognition is performed on the speech signal, the electronic apparatus may obtain the phonetic transcriptions matching the real pronunciations according to the acoustic model, and obtain the phonetic spellings matching the phonetic transcriptions from the syllable acoustic lexicon. In particular, according to each of the phonetic spellings, the electronic apparatus may find the words matching the phonetic spelling and the word probabilities thereof from the language model. Lastly, the electronic apparatus may obtain the text sequence probabilities by calculating the word probabilities of the phonetic spelling corresponding to the words, and select the text sequence corresponding to the largest one among the text sequence probabilities to be used as the recognition result. In comparison with traditional methods, the invention is capable of recognizing the phonetic spelling to the text according to the phonetic spelling corresponding to the real pronunciations of the speech inputs, hence the ambiguity produced while mapping the speech to the text may be eliminated, and the message inputted by the original speech input (e.g., a polyphone in different pronunciations) may be retained. Accordingly, the method for building the language model, the speech recognition method and the electronic apparatus of the invention may be more accurate in recognizing the language and the semanteme corresponding to the speech signal of different languages, dialects or different pronunciation habits, so as to improve the accuracy of the speech recognition.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A speech recognition method, adapted to an electronic apparatus, comprising:
   obtaining a phonetic transcription sequence of a speech signal according to an acoustic model, and the phonetic transcription sequence including a plurality of phones;
   obtaining a plurality of phonetic spellings matching the phonetic transcription sequence according to the phonetic transcription sequence and a syllable acoustic lexicon;
   obtaining a plurality of text sequences and a plurality of text sequence probabilities from a language model according to the phonetic spellings, and
      matching each of the phonetic spellings with a candidate sentence table, so as to obtain a word probability of each of the phonetic spellings corresponding to each of the words in the candidate sentences; and
      calculating the word probabilities of the phonetic spellings, so as to obtain the text sequence probabilities, wherein the candidate sentences corresponding to the text sequence probabilities are the text sequences; and
   selecting the text sequence corresponding to a largest one among the text sequence probabilities as a recognition result of the speech signal.

2. The speech recognition method of claim 1, further comprising:

obtaining the acoustic model through training with the speech signals based on different languages, dialects or different pronunciation habits.

3. The speech recognition method of claim 2, wherein the step of obtaining the acoustic model through training with the speech signals based on different languages, dialects or different pronunciation habits comprises:
receiving the phonetic transcription sequences matching pronunciations in the speech signals; and
obtaining data of the phones corresponding to the phonetic transcription sequences in the acoustic model by training according to the speech signals and the phonetic transcription sequences.

4. The speech recognition method of claim 1, wherein the step of obtaining the phonetic transcription sequence of the speech signal according to the acoustic model comprises:
selecting a training data from the acoustic model according to a predetermined setting, wherein the training data is one of training results of different languages, dialects or different pronunciation habits;
calculating a phonetic transcription matching probability of the phonetic transcription sequences matching the phones according to the selected training data and each of the phones of the speech signal; and
selecting the phonetic transcription sequence corresponding to a largest one among the phonetic transcription matching probabilities to be used as the phonetic transcription sequence of the speech signal.

5. The speech recognition method of claim 1, wherein the step of obtaining the phonetic spellings matching the phonetic transcription sequence according to the phonetic transcription sequence and the syllable acoustic lexicon comprises:
obtaining an intonation information corresponding to each of the phonetic spellings according to a tone of the phonetic transcription sequence.

6. The speech recognition method of claim 1, wherein the step of obtaining the phonetic spellings matching the phonetic transcription sequence according to the phonetic transcription sequence and the syllable acoustic lexicon further comprises:
obtaining the phonetic spellings matching the phonetic transcription sequence and obtaining a phonetic spelling matching probability of the phonetic transcription sequence matching each of the phonetic spellings according to the phonetic transcription sequence and the syllable acoustic lexicon; and
selecting the phonetic spelling corresponding to a largest one among the phonetic spelling matching probabilities to be used as the phonetic spelling matching each of the phonetic transcription sequences.

7. The speech recognition method of claim 6, further comprising:
selecting the text sequence corresponding to the largest one among associated probabilities including the phonetic spelling matching probabilities and the text sequence probabilities, to be used as the recognition result of the speech signal.

8. The speech recognition method of claim 1, further comprising:
receiving a plurality of candidate sentences; and
obtaining a plurality of phonetic spellings matching each of words in each of candidate sentences and a plurality of word probabilities according to a text corpus, so as to obtain the candidate sentence table corresponding to the candidate sentences.

9. The speech recognition method of claim 8, further comprising:
obtaining the text corpus through training with a plurality of speech signals based on the speech signals of different languages, dialects or different pronunciation habits.

10. The speech recognition method of claim 9, wherein the step of obtaining the text corpus through training with the speech signals based on different languages, dialects or different pronunciation habits comprises:
receiving the phonetic spellings matching pronunciations of each of the words according to the corresponding words in the speech signals; and
obtaining the word probabilities of each of the words corresponding to each of the phonetic spellings in the text corpus by training according to each of the words and the phonetic spellings.

11. The speech recognition method of claim 9, wherein the step of obtaining the text sequences and the text sequence probabilities from the language model according to the phonetic spellings comprises:
selecting the candidate sentence table according to a predetermined setting, wherein the candidate sentence table is corresponding to the text corpus obtained by training with one of the speech signals based on different languages, dialects or different pronunciation habits.

12. An electronic apparatus, comprising:
an input unit, receiving a speech signal;
a storage unit, storing a plurality of program code segments; and
a processing unit, coupled to the input unit and the storage unit, the processing unit executing a plurality of commands through the program code segments, and the commands comprising:
obtaining a phonetic transcription sequence of the speech signal according to an acoustic model, and the phonetic transcription sequence including a plurality of phones;
obtaining a plurality of phonetic spellings matching the phonetic transcription sequence according to the phonetic transcription sequence and a syllable acoustic lexicon;
obtaining a plurality of text sequences and a plurality of text sequence probabilities from a language model according to the phonetic spellings, and
matching each of the phonetic spellings with a candidate sentence table, so as to obtain a word probability of each of the phonetic spellings corresponding to each of the words in the candidate sentences; and
calculating the word probabilities of the phonetic spellings, so as to obtain the text sequence probabilities, wherein the candidate sentences corresponding to the text sequence probabilities are the text sequences; and
selecting the text sequence corresponding to a largest one among the text sequence probabilities as a recognition result of the speech signal.

13. The electronic apparatus of claim 12, wherein the commands further comprise:
obtaining the acoustic model through training with the speech signals based on different languages, dialects or different pronunciation habits.

14. The electronic apparatus of claim 13, wherein the command of obtaining the acoustic model through training with the speech signals based on different languages, dialects or different pronunciation habits comprises:

receiving the phonetic transcription sequences matching pronunciations in the speech signals; and obtaining data of the phones corresponding to the phonetic transcription sequences in the acoustic model by training according to the speech signals and the phonetic transcription sequences.

15. The electronic apparatus of claim 12, wherein the command of obtaining the phonetic transcription sequences of the speech signal according to the acoustic model comprises:

selecting a training data from the acoustic model according to a predetermined setting, wherein the training data is one of training results of different languages, dialects or different pronunciation habits;

calculating a phonetic transcription matching probability of the phonetic transcription sequences matching the phones according to the selected training data and each of the phones of the speech signal; and selecting the phonetic transcription sequence corresponding to a largest one among the phonetic transcription matching probabilities to be used as the phonetic transcription sequence of the speech signal.

16. The electronic apparatus of claim 12, wherein the command of obtaining the phonetic spellings matching the phonetic transcription sequence according to the phonetic transcription sequence and the syllable acoustic lexicon comprises:

obtaining an intonation information corresponding to each of the phonetic spellings according to a tone of the phonetic transcription sequence.

17. The electronic apparatus of claim 12, wherein the command of obtaining the phonetic spellings matching the phonetic transcription sequence according to the phonetic transcription sequence and the syllable acoustic lexicon further comprises:

obtaining the phonetic spellings matching the phonetic transcription sequence and obtaining a phonetic spelling matching probability of the phonetic transcription sequence matching each of the phonetic spellings according to the phonetic transcription sequence and the syllable acoustic lexicon; and selecting the phonetic spelling corresponding to a largest one among the phonetic spelling matching probabilities to be used as the phonetic spelling matching each of the phonetic transcription sequences.

18. The electronic apparatus of claim 17, wherein the commands further comprise:

selecting the text sequence corresponding to the largest one among associated probabilities including the phonetic spelling matching probabilities and the text sequence probabilities, to be used as the recognition result of the speech signal.

19. The electronic apparatus of claim 12, wherein the commands further comprise:

receiving a plurality of candidate sentences; and obtaining a plurality of phonetic spellings matching each of words in each of candidate sentences and a plurality of word probabilities according to a text corpus, so as to obtain the candidate sentence table corresponding to the candidate sentences.

20. The electronic apparatus of claim 19, wherein the commands further comprise:

obtaining the text corpus through training with a plurality of speech signals based on the speech signals of different languages, dialects or different pronunciation habits.

21. The electronic apparatus of claim 20, wherein the command of obtaining the text corpus through training with the speech signals based on different languages, dialects or different pronunciation habits comprises:

receiving the phonetic spellings matching pronunciations of each of the words according to the corresponding words in the speech signals; and obtaining the word probabilities of each of the words corresponding to each of the phonetic spellings in the text corpus by training according to each of the words and the phonetic spellings.

22. The electronic apparatus of claim 20, wherein the command of obtaining the text sequences and the text sequence probabilities from the language model according to the phonetic spellings comprises:

selecting the candidate sentence table according to a predetermined setting, wherein the candidate sentence table is corresponding to the text corpus obtained by training with one of the speech signals based on different languages, dialects or different pronunciation habits.

* * * * *